United States Patent [19]
Garrett et al.

[11] 3,886,988
[45] June 3, 1975

[54] BICYCLE BAG

[75] Inventors: Wayne E. Garrett, San Mateo; John W. McKean, Jr., Woodside, both of Calif.

[73] Assignee: Jeanne P. Garrett, San Mateo, Calif.; a part interest

[22] Filed: July 19, 1973

[21] Appl. No.: 380,614

[52] U.S. Cl. .................. 150/52 R; 217/37; 206/335
[51] Int. Cl. ............................................ B65b 11/00
[58] Field of Search .......... 150/52 K, 52 R; 217/37; 206/335

[56] References Cited
UNITED STATES PATENTS
2,243,981    6/1941    Rowan .............................. 150/52 K
FOREIGN PATENTS OR APPLICATIONS
F13,531    4/1956    Germany ........................... 150/52 K
471,696    7/1913    France .............................. 150/52 K
292,628    11/1953    Switzerland ........................ 150/52 K

*Primary Examiner*—William I. Price
*Assistant Examiner*—Ro E. Hart

[57] ABSTRACT

A bag for enclosing a partially disassembled bicycle includes right and left side fabric panels attached to a rigid base. Support means are connected to the base for supporting a bicycle frame in an inverted position and substantially upright relative to the base with the base and support means serving to maintain the frame in a standing position. A flap depends from the inner side and upper portion of each side panel to define a wheel-receiving pouch between the flap and adjacent side panel on each side of the bicycle frame. Fastening means, such as a zipper, join the side panel members together to enclose the disassembled bicycle and handles are attached to the bag to permit easy portage.

19 Claims, 7 Drawing Figures

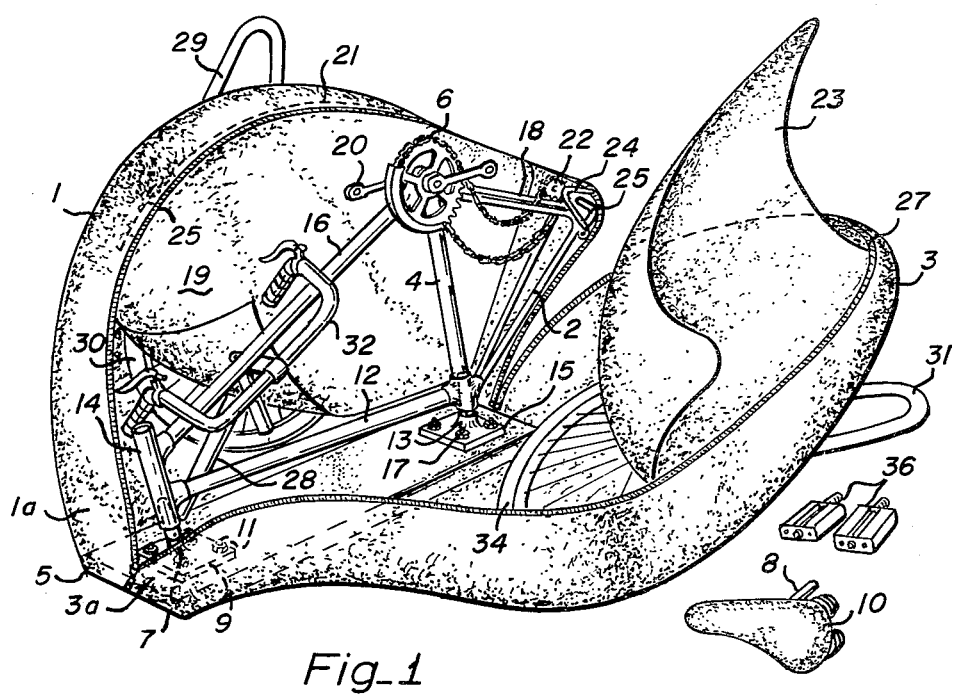
Fig_1
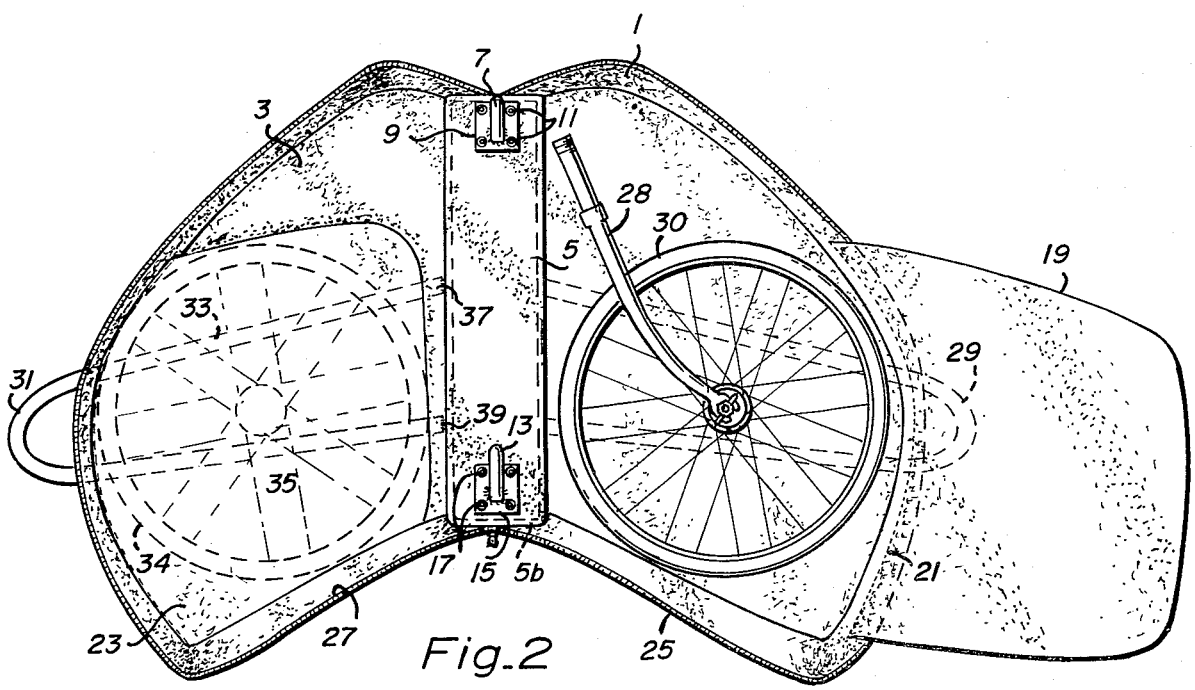
Fig_2

BICYCLE BAG

FIELD OF THE INVENTION

This invention relates to bicycle bags and, more particularly, to a bag for carrying a partially disassembled bicycle.

BACKGROUND OF THE INVENTION

The bicycle is a conventional and well-known structure used for transportation, sport and recreation. Since cycling has come into increasing vogue as a recreational pursuit, many persons, cyclists, seek to avoid the inconvenience and danger inherent in traffic congestion prevalent in the crowded cities and suburbs and instead do their cycling in the less crowded quiet of the countryside and other rural areas, usually away from their principal city home. Thus the sight of an automobile traveling along the freeways with one or more bicycles mounted above the car trunk is common.

Some bicycles however have an overall geometry and size in comparison to the modern compact automobiles that makes portage of the bicycle somewhat impractical and perhaps difficult. For those instances it is particularly desirable if the bicycle could be disassembled or folded and placed in a small package.

It is apparent that anyone can completely disassemble a bicycle and stuff the components into a simple bag or bags. However, a great deal of time is required for disassembling as well as reassembling the bicycle, several hours perhaps, and for one wishing to cycle, the thought of spending most of the time assembling bicycle parts renders that approach impractical. Thus the lack of ease of so disassembly and reassembling the bicycle is a major obstacle to the apparent approach.

Heretofore various means have been proposed to package a bicycle for easy portage. Such proposals included such modifications to the bicycle structure that render the structure foldable or collapsible and packageable into a bag or bags. One prior art proposal is that advertised at Page 32 in the publication "Bicycling", July 1970, and referred to as a "velo demountable" or the Rene Herse folding bicycle. In that proposal certain structural modifications to the bicycle frame include a horizontal bar which telescopes into the vertical bar beneath the seat and a beveled lower joint held with a locking sleeve so that the front half of the bike is folded over onto the back half, and the handlebars, seat and post and pedals removed. The wheels remain in place in the foregoing construction. And for portage this enables the bicycle to be reduced to two bags, one larger than the other, with one carrying the handlebars, seat with post and pedals. While that device appears to be suitable, that alternative does not appear to have attained significant popularity for reasons which one can only speculate upon. Thus the bicycle is rendered so "non-standard" by the structural modifications that possibly it becomes to expensive a device and beyond the reach of most as a practical alternative.

OBJECTS OF THE INVENTION

Accordingly, it is an object of the invention to provide a bag of small and convenient size for portage of a partially disassembled bicycle.

It is a further object of the invention to provide a novel bicycle bag that contains a disassembled bicycle having relatively few modifications that avoid weakening frame members.

It is an additional object of my invention to provide inexpensive structure for a bicycle which renders the same partially disassembleable and easily reassembleable quickly and expeditiously, for inclusion in a novel bicycle bag.

And it is a still further object of my invention to provide a bag for carrying partially disassembled bicycle and for stowing same in small compact automobiles and in private aircraft.

BRIEF SUMMARY OF THE INVENTION

In accordance with the foregoing objects, a bag is provided large enough in area and volume to enclose the bicycle frame from which the handlebars, wheels, fork, seat and pedals have been disassembled, and all disassembled parts, said bag having opposed right and left side panels of a pliant fabric material, suitably vinyl, a rigid elongated base member connected to the side panels, and support means for holding the bicycle frame in an inverted upright position on the base. The base is of a width greater than the width of the bicycle and functions with the support means to prevent the frame from tipping over. The right and left side panels open outwardly from the base and a fastening means, suitably a zipper, is provided to join the two panels together to close the bag. In accordance with an aspect of the invention, right and left side flaps are attached at the upper end of the right and left side panels and depend therefrom downwardly to form therewith a pair of wheel-receiving pouches or compartments. In accordance with an additional aspect of the invention, the base is a rectangular elongated piece of wood fitted within a bottom fabric compartment. Further in accordance with the invention the support means comprise first and second projecting pins mounted at each end of the base and the first pin is adapted to fit within the fork tube of the frame and the second pin is adapted to fit within the seat tube of the frame. To make the bike easily disassembleable in addition to conventional structure the front fork ball bearings common to bikes are eliminated and replaced with a bronze friction bearing.

The foregoing and other objects and advantages of the invention as well as the structure characteristic of the invention and equivalents thereto become more apparent and are better understood by giving consideration to the detailed description of a preferred embodiment of the invention which follows taken together with the illustrations of the drawings that are provided.

DESCRIPTION OF THE DRAWINGS

In the drawings:

FIG. 1 illustrates in exaggerated perspective an embodiment of our invention in a bicycle bag and, additionally, the major elements of a demountable partially disassembled bicycle positioned therein;

FIG. 2 illustrates a top view of the bicycle bag of FIG. 1 in an open position with the bag sides folded down and a wheel covering flap in the open position;

DETAILED DESCRIPTION OF DRAWINGS

Figure 3:
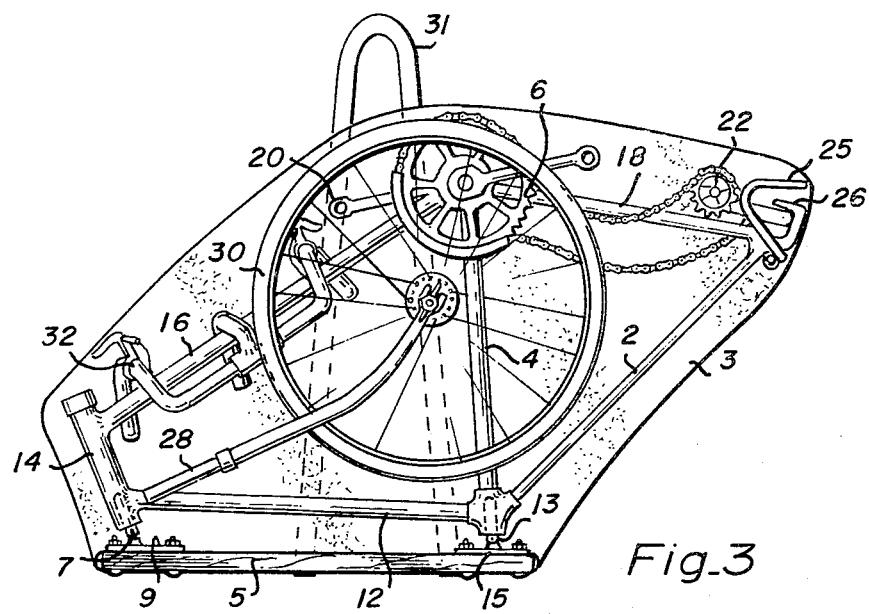
FIG. 3 illustrates a side outline view of the embodiment of FIG. 1 treated as being partially transparent so as to illustrate the preferred manner of packing some of the components of a partially disassembled bicycle.

In FIG. 1 a preferred embodiment of the bicycle bag of the invention and a partially disassembled bicycle as well, is illustrated in somewhat exaggerated perspective with the bag in a semi-open position. The reader can thus readily determine the relationship of size and geometry between a given bicycle, since the invention is not limited to any specific size of bicycle or bag, and the elements that form a given bicycle bag. Thus a left side panel 1 and a right side panel 3 and a base 5 are provided in the bag. Suitably the side panels are of a fabric material, such as vinyl, so as to be pliant and strong. The base is made of an elongated rectangular piece of wood that is received within and sewn into a pouch or compartment of the same fabric material forming the side panels. And the base is of a width greater than the width of the bicycle frame. The side panels are attached to the base by sewing along the bottom end to the material that forms the base compartment. A portion of each side panel extends around the width of base 5 as at portions $1_a$ and $3_a$ at each of the left and right ends of the base. Obviously any well known bag or luggage assembling techniques may be used to assemble together the elements of the combination of this invention.

It is best to diverge at this point in the description to consider and identify the major elements of a conventional ten-speed bicycle, including the modifications thereof, positioned within the bag in FIG. 1.

The frame is that which, directly or indirectly, supports all other components elements of the bicycle. This includes a seat tube 4, a vertical depending cylindrical member that extends down to the hub, not visible, that contains the drive wheel 6, and which on its upper end receives the seat rod 8 of seat 10 shown to the right of the bag; a frame member or top tube, 12, which extends horizontally on a men's bicycle; a head tube 14, which receives the fork and handlebars; and the down tube, a bar 16 which extends at an angle down from the underside of the head tube to the drive wheel hub. Drive wheel 6 is mounted in the hub and pedal arms 20 are connected to the drive wheel. The chain stays, a pair of lower struts 18 extend from the hub rearwardly and join with the seat stays, another pair of struts or bars 2 which extend from the end of the seat tube 4. The sprocket 22 and derailler mechanism 24; derailler guard 25 and the slot 26 for mounting the rear wheel are located at this juncture. The front wheel fork 28 which is fitted within the head tube on an assembled bicycle remains joined to front wheel 30. The handlebar 32 which is fitted to the stem which is coupled to the fork through head tube 14 in an assembled bike is placed on the angular bar 16 so as to eliminate the need to remove brake cables (not illustrated) connected thereto. The head brake levers are conventionally mounted on the handlebars, which obviously would complicate the disassembly and reassembly of the bicycle. A rear wheel 34 is packed in the bag. Seat 10 and pedals 36 and other small loose parts as well as tools to assist, such as wrench and mallet, not illustrated, are placed in the bag in any available space.

Other than to show the desired objectives and relationships between the bag and the bicycle parts, there is indeed no need to illustrate or describe in full detail conventional elements of a conventional bicycle. However various modifications to a bicycle are desirable to render the bike more practical for assembly and disassembly and these are described elsewhere in this specification in greater detail.

Continuing further with the description of the elements of the bicycle bag, a first support pin 7, suitably of aluminum, is connected to a metal flange base 9. Metal flange 9 contains four bolt holes and is attached to the upper surface of base 5, proximate one end thereof, by the four bolts 11. Support pin 7 projects upward from and at a slight angle to the plane of flange 9 and base 5. As is illustrated, support pin 7 fits within the passage of head tube 4 of the bike frame. Ideally the support pin should be of a cylindrical shape and of an outer diameter approximately the same as the inner diameter of the head tube and should extend into the head tube a sufficient distance so as to provide both good anchoring to prevent angular movement, tipping between the bike frame and bag base 5, and to prevent the bike from falling off the support pin if any slight rocking or tipping moment does occur.

A second support pin 13, also of aluminum, is attached to a metal flange base 15. And metal flange 15 is in turn attached to the upper surface of bag base 5 proximate the other end thereof by four bolts 17.

Ideally pin 13 is of a cylindrical shape and is of an outer diameter approximately the same as the inner diameter of the seat tube and mates with the cylindrical passage of the seat tube. The pin extends into the seat tube a sufficient distance. This provides good anchoring and prevents the bike from slipping off due to any slight rocking or tipping moment.

Reference is again made to the left side panel 1. A flap 19 is shown with an upturned corner and reveals wheel 30. The flap is attached along its upper end to left side panel 1, suitably by means of the sewn seam represented by the zag line 21, and depends from the side panel. Suitably the flap is of the same fabric material, vinyl, as the panel, and is large enough in area to cover wheel 30. A second like flap 23, is illustrated in a partially raised position which exposes a second wheel 34. Correspondingly, flap 23 is attached along its upper end to the upper inside of the right side panel 3, also suitably by a sewn seam, and depends from the upper side of the side panel down to the base. Flap 23 is also of the vinyl fabric and is large enough in area to cover wheel 34. As is apparent in the illustration each flap functions with the adjacent side panel to form a wheel-receiving pouch or compartment, one on each side of the bike frame and additionally serves as a barrier which prevents the hub of the wheels from directly contacting the bike frame.

A zipper, including a zipper track 25 along the edges of flap 1 and a zipper track 27 along the edges of flap 3, is provided to fasten together the two side panels and close the bag. Handles or grips 29 and 31 are attached to panels 1 and 3. Suitably the handles are formed of a wide canvas or cotton web which extends down the side of the panel to the base as is brought out in greater detail hereinafter.

For the convenience of the reader and clarity the various elements are identified in the subsequent figures by the same identifying numbers used to identify those elements in the illustration of FIG. 1. In the top view of FIG. 2 the bag is fully opened and the left flap 19 is folded out. Base 5 of the bag is attached to the left side panel 1 and right side panel 3. As was noted heretofore, the bag base is conveniently formed from a rectangular wood insert, which is illustrated in this figure by the dash lines $5_b$, and this wood insert is sewn into a fabric compartment the outline of which is visible in the figure. Pin 7 and flange 9 and bolts 11 are mounted to the left end of the base and seat tube support pin 13 and its associated flang 15 and mounting bolts 17 are located at the right side of base 5. Flap 19 is folded out and exposes the wheel 30 and attached fork 28 which were stored in the formed pouch. A seam 21 represented by a zig zag line secures an end of flap 19 to the upper end of side panel 1 as is more clearly illustrated in this figure. The second flap 23 is in its closed position covering the rear wheel 34, represented by the invisible lines. The zipper portions 23 and 25 extend all about the periphery of the corresponding side panel, extending from one end of the base to the other.

The grip 29 is covered by flap 19 and hence is represented in this figure by an invisible line. The second grip 31 is visible in part in this figure, in addition the preferred construction of the grip is most conveniently illustrated in figure inasmuch as it is less obscured by other elements. Thus grip 31 is formed by a loon in a long flat canvas web. The extended arms of this loop are numbered 33 and 35 and since they are located on the outside surface of side panel 3 they are illustrated by a dash line. Suitably the web is sewn in place to the outside of the fabric panel and the ends are sewn into place in the seam between the panel and the bag base as indicated by the zag lines 37 and 39. The manner of fabrication and structure of the other grip member is essentially identical and need not be illustrated or described further.

In the side view of FIG. 3 the embodiment of FIGS. 1 and 2 is packed and closed. As is illustrated the outline geometry of the bag and hence of right side panel 3 conforms somewhat to the outline of the bicycle frame as is our perference. Inasmuch as we desire to have a bag that is as small in size as is possible, without excess or waste material, a shape which conforms to the shape of the bike frame is obviously preferable. It is noted that the foregoing geometry may be modified in other constructions. For example the side geometry may be rectangular in shape. Since the fabric is pliant vinyl, in tight packing situations where the bag is placed in an automobile truck, any excess fabric may be folded over.

FIG. 3 also illustrates more clearly the manner of packing the partially disassembled bicycle. In so doing the sections of the web structure that form the handle have been in part omitted and the fabric of the bag, side panel 3, and flap 23 is considered transparent. Thus the bicycle frame is mounted in place. Support pin 7 extends into head tube 14 and support pin 13 extends into seat tube 4 and both are attached to bag base 5 by means of the flanges 9 and 15. Handlebars 32 are conveniently draped over frame member 16. In this figure, front wheel 30 and fork member 28 are relocated to the left side of the frame in the wheel compartment between the flap and side panel from the position in the opposite pouch in which it is placed in FIGS. 1 and 2, in order to illustrate the versatility of the bag. Flap 23 which prevents the axis of wheel 30 from contacting the bike frame is omitted from the illustration to avoid obscuring same with unnecessary detail. For like reasons the rear wheel located on the other side of the frame, as well as the seat, the pedals, and miscellaneous tools that are packed into available spaces, are also omitted from the figure. For the description of other component parts of the bicycle labeled in FIG. 3 and not here described, the reader may make reference to the description of the like-labeled elements of the preceding figures.

Figure 4:
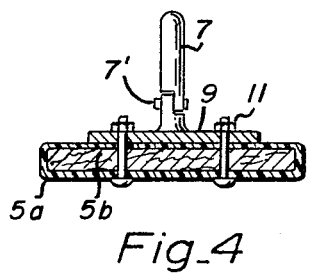
FIG. 4 illustrates in greater detail the preferred construction of a head tube support pin used in the preceding embodiments.
Figure 5:
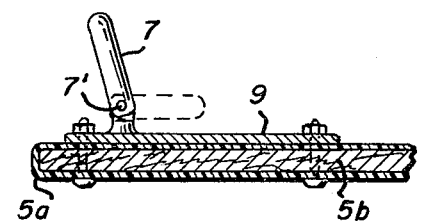
FIG. 5 illustrates another view of the head tube support pin of FIG. 4.

The partial section views of FIGS. 4 and 5 illustrate in somewhat greater detail a preferred construction of the support pins employed in the embodiment of the preceding figures. Thus the portion of base 5 in section comprises the wood insert $5_b$ and the vinyl pocket $5_a$. The metal flange 9 is fastened to base 5 with nuts and bolts. Support pin 7 is of an elongated cylindrical shape rounded at the tip. The support pin is formed in two parts which are assembled together and have a conventional type pivotable joint with a hinge pin 7'. This allows the top portion of pin 7 to pivot about an axis that is parallel to the width axis of the base or as otherwise stated to fold down in the direction of elongation of the base. The bottom half of the pin is welded to flange 9. As shown by the dash line in FIG. 5 support pin 7 may be folded down when not in use. The pivotable relationship between the support pin and the base allows for some angular self-adjustment between the plane of the base and the support pin axis. This is useful where the angular relationship between the head tube and horizontal bar of the bicycle frame can vary between bicycle to bicycle or to permit some latitude in tolerance in the manufacture of either bag or bicycle so as to permit self-adjustment when the angle of the head tube to the base 5 varies or in the positioning of the metal base on the base. The construction of the support pin 13 of the preceding figures is the same as that of pin 7 and associated parts.

Although the foregoing is true in the preferred embodiment it is noted that other alternative constructions can be employed. For example, one of the support pins can be fixed in position, eliminating the pivotable joint, to provide a less expensive construction. Further if only a single pin is sufficient to maintain the bicycle upright, then the second support pin may be replaced by spaced wood blocks to abut the seat tube or frame on each side simply to prevent lateral movement of the frame along the base. And while we have chosen to use a pin type of arrangement as the frame supporting means to maintain a bicycle frame at essentially a perpendicular position relative to the plane of the bag base, other means can be chosen to do so. For example, various types of foldable brackets, secured to the base, can be substituted for the support pin arrangement, which brackets in an unfolded or extended position holds the bike uprights relative to the base.

As previously described, the bicycle may be of standard design without any of the modifications that may render it quickly and easily disassembled. With that the biggest handling problem is the fork tube ball bearings. As is generally the case, the ball bearings are packed loose in their races and when the handlebars and stem and fork are removed, these bearings will drop out and must be collected and stored in perhaps a small bag.

Figure 7:
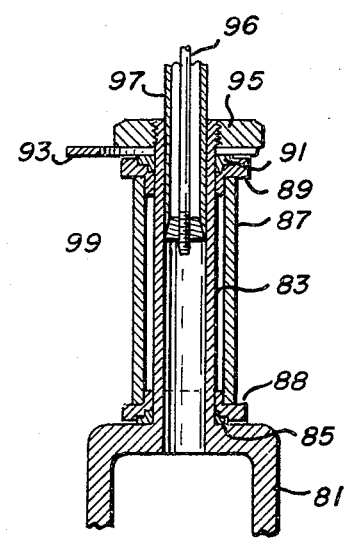
FIG. 7 illustrates in section the construction of a head tube bearing arrangement for a partially disassembleable bicycle.

We prefer however to incorporate a bike that has certain modifications. For example, a bike in which the wheels are held to the frame by wing nuts or quick release fittings on front and rear wheels, in which the seat is clamped with a wing nut, the pedal axles have a hole drilled through so that a rod wrench can be used to easily remove them, the handlebar stem is held in place with a knurled nut, as well as the front fork assembly and in which the ball bearings are eliminated from the head tube bearing assembly. This novel bearing construction is illustrated in FIG. 7 in section. The fork is partially illustrated as 81. The fork tube 83 is connected to the fork. An oil impregnated bronze bearing 85 having a ring-like shape is friction fitted to the fork tube. The head tube is shown in section at 87. A lower bearing race 88 of ring-like shape and suitably of stainless steel, is seated in the head tube and mates with lower bearing 85. A second upper bearing race 89 is seated in the upper end of head tube 87. An upper bearing 91, also suitably a ring-shaped oil impregnated bronze structure, is provided and mates with bearing race 89. The brake cable guide 93 fits over the head tube and a knurled nut 95 is tightened onto the threaded end of fork tube 83 to compress and hold the assembly together and yet permit rotational movement between the fork tube and the head tube which allows the handlebars to turn the fork. The handlebar stem 97, in section and only partially illustrated, fits in the head tube and the stem bolt 96, partially illustrated, extends through the stem and is screwed into the internal nut 99 on the fork tube to secure the handlebar stem to the fork as is conventional. By simply removing the stem bolt, the handlebar stem and the knurled nut, the head assembly is disassembled and bearing races 88 and 89 and bearing 91 may be conveniently handled and placed in a bag. This bearing construction thus eliminates the inconvenience of handling a large number of loose ball bearings.

Reference is again made to FIGS. 1 and 2. Inasmuch as the disassembly of a bicycle in conventional it need not be discussed. Assuming the bag in the opened position as in FIG. 2, the bike frame is inverted and placed onto the support pins 7 and 13. The support pins hold the frame substantially upright relative to base 5. Since the width of base 5 is greater than the width of the bike frame, the center of gravity of the frame remains over base 5. Thus although the plane of the bike frame may be inclined slightly from a true perpendicular to the plane of base 5, maintaining the position of the center of gravity over the base ensures that the bike frame will not tip over and fall down, tipping the bag base onto its side in so doing. The bag base and the support pins thus serve to maintain the bike frame standing in the inverted position substantially upright on base 5. Ideally the frame should stand perpendicular to base 5.

When fully packed the major weight such as the wheels 30 and 34 are packed on opposite sides of the bike frame and serve to counterbalance one another when the bag is closed and standing upright. The bag thus remains standing. This avoids the problem of having to stoop to upright a bag that is unbalanced and flops over. To ensure balance, the additional components are packed in available space over base 5 and some tools may be inserted next to wheel 34 to counterbalance the slight additional weight of fork 28 attached to front wheel 30.

Primarily flaps 19 and 23 cover the wheels and thereby prevent the axles of those wheels from coming into contact with and scratching the bike frame. Secondarily, because the flaps are secured at the upper end of the panel, when the bag is unzipped, opened, and the side panels are allowed to tip over and drop down, as in the position of FIG. 2, the flap holds the wheel particularly along the most vertical portion, within the wheel-receiving compartment, thereby simply preventing the wheel from remaining standing or rolling off.

The utility of the bag as a convenient means to carry a partially disassembled bicycle is in itself clear from the foregoing description. In one embodiment a Peugeot UO-8 model bicycle modified to incorporate the quick release mechanisms herein described, including the novel bearing arrangement on the front fork, was placed into a bag measuring 28 inches in height and 37 inches in length, and the base insert consisted of a rectangular piece of plywood of 24 inches in length, 6 inches in width, and ⅜-inch in thickness. And the bag weighed approximately 5 pounds. The combination of bag and bike weighed approximately 33 pounds. With this weight and dimensions the bicycle is seen to be easy to pack into automobile trunks and easy for the average person to carry. Further in contrast to some types of prior art bicycle modifications the top tube 4 in FIG. 3 which supports the seat, and hence the rider, is intact and does not require any modifications which may indeed weaken that member. In fact, the strength of the entire bicycle frame is not endangered by modification.

As is further apparent, upon opening the bag the sides and the enclosed wheels are set down on the ground and the bicycle frame, as a result of the cooperation of elements as described, remains standing. Each wheel may be individually removed from its compartment in the side panel and assembled into place without any essential tipping.

The manner of determining the center of gravity of an odd shaped object, such as a bicycle frame, is old and found in texts on physics and mechanics and need not be detailed here. It is elementary that if the center of gravity of the bicycle is maintained by the support pins directly over the center of the base, tipping moment which would result in the bike tipping over and possibly turning over the bag with it, is avoided; much like a person who is standing atop a chair directly on center. This is obviously an ideal condition not to be fully expected of the supports due to normal variations in manufacture; the slight differences in the diameters of the pin and the head or seat tube inner diameter; and in the positioning of the pins themselves. As is also elementary mechanics, the bike does not tip over even if the bike frame tilts somewhat from the perpendicular if the support pins maintain the center of gravity of the bike over the area of the bag base. Thus the bike frame may tip somewhat from the vertical and as long as the center of gravity of the frame remains over the base area between the support pin and the elongated edges of the base, the frame remains upright, again much like a person who may move around on the seat of a chair without tiping it over. Tipping occurs only when one extends over the base sufficient to overcome any counterbalancing momenets. The point of unstable equilibrium, the point at which the bike and the bag will turn over, is the point that the weight of the bag considered at the center of gravity of the bike multiplied by the distance obtained by projecting the center of gravity to the plane of the base and measuring from the point so obtained to the base edge, the fulcrum, equals the weight of the base multiplied by the distance between the center of gravity of the base (center of base width) and the base edge and where the base is symmetrical a distance equal to one-half the width of the base.

According to our teachings the base and the support pins should be properly sized and weighted relative to a given bicycle that although the angle between the plane of the bike frame and the plane of the base may shift from the true perpendicular, and thereby create a tipping moment, the tipping moment should never by sufficient to overcome the stabilizing moment of the base and thus prevent tipping.

Ideally the support pins should maintain the plane of the bicycle frame, the plane formed by the seat tube and angular tube as well as the horizontal bar on a true perpendicular to the plane of the base.

As the foregoing principles suggest, if with a given bicycle a given base and support arrangement are insufficient to maintain the frame from tipping over, several modifications are possible. Thus if the support pin arrangement, due to design or manufacturing tolerance, does not hold the frame exactly upright and further does not hold the center of gravity of the frame over that of the base, a better support arrangement that does so is obviously suggested or a base construction of greater width is dictated to solve any tipping problem. On the other hand, if a wider base of the type illustrated in the figures is used, the bag becomes larger in size which goes contrary to the objective of having a bag as small as is practically possible.

Figure 6:
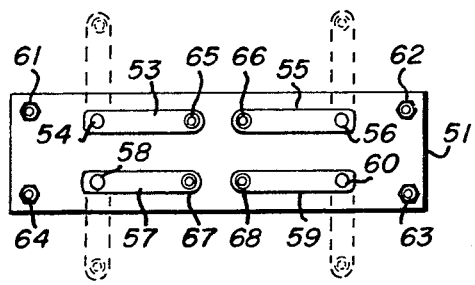
FIG. 6 illustrates a modification of the bag base which permits the width thereof to be temporarily enlarged.

Thus with heavier bicycles or where the support pins are unchanged we can temporarily make the base wider by making use of a construction such as shown in FIG. 6 or any equivalent thereto. Thus a base 51 of a given size rectangular shape of wood is viewed from the underside. Four flat rectangular arms, suitably of iron or aluminum, 53, 55, 57 and 59, are pivotally mounted to the base 51 by means of pins or bolts 54, 56, 58 and 60. In use they are open pivoted from the position shown outward to the position indicated by the dash lines to thus effectively make the base more wide and eliminate tipping. A plurality of feet 61, 62, 63 and 64 are provided on wood base member 51, which are sufficient in height. For convenience, a plurality of feet, 65, 66, 67 and 68, are included on each of the foldaway arms. Ideally the height of feet 61, 62, 63 and 64 should extend to the same distance from member 51 as the combined thickness of the arms and length of the attached feet thereon so as to prevent any see-saw effect. Obviously each of the feet 61 through 64 may be adjustable.

Where one decides upon a specific model of bicycle and decides upon the dimensions of the head tube support pin and the seat tube support pin it becomes desirable to experimentally determine the size required for the bag base prior to deciding upon the fabric side panel geometry and dimension. Thus a tentative base size is selected and the support pins are spaced along the base to correspond to the distance between the head tube and seat tube of the bike frame and the pins are attached. The frame of the bike is then inverted and mounted upon the support pins as shown in FIGS. 1–3. If the bike frame does not tip over with the base then the base width is sufficient. If the bike frame and base tips over, then the base width is insufficient and must be made larger. A new base of greater width is made and tested in the same described manner. By the foregoing procedure one determines how narrow a base can be made for a particular bicycle. Having determined a width suitable for obtaining a desirable measure of stability one can thereupon proceed to determine the panel re geometry.

In some minor respects the described invention in a bicycle bag resembles a giant "duffle" bag, large enough to hold a bicycle. A simple bag large enough to hold the clutter of a fully disassembled bicycle is not the purpose or object of my invention. And inasmuch as the size of the bag to be carried around should be as small as possible a simple giant sized bag or even a packing crate for enclosing a fully assembled bicycle is outside the purpose and object of my invention. In our invention the bicycle frame from which the seat and the fork have been removed is held standing in an inverted position by the support means and the bag base. This allows the frame to stand in a position to permit the wheels to be withdrawn from the bag and assembled into place on the frame or disassembled in a convenient and expeditious manner. This prevents the bike from flopping around so that the bike can be assembled reasonably quickly and with less effort and such a feat clearly does not appear possible with a simple bag.

The foregoing details of a preferred embodiment of the invention are presented to disclose to one skilled in the art the manner of making and using the invention and not to limit my invention to those details. Inasmuch as many variations of those details presented illustrative of the preferred embodiment of the invention become apparent and suggest themselves to one skilled in the art upon reading this specification, including obvious substitution of equivalent elements, improvements or other modifications, all of which come within the scope of the invention, it is expressly understood that the invention is to be construed in the broadest sense within the full spirit and scope of the appended claims.

What we claim is:

1. A bag having right and left side panels of flexible fabric material;
   a rigid elongated base at the bottom of said bag coupled to said panels; said bag being sufficient in size to receive the partially disassembled components of a bicycle, including two wheels and bicycle frame thereof and said base being of a length slightly greater than the distance between the head tube and the seat tube of said bicycle frame and said bag being of a width to fit a wheel in between each side panel and a bicycle frame in side-by-side arrangement;
   coupling means connected to said base for holding said bicycle frame in a predetermined standing position relative to said base so that the center of gravity of said frame remains over said base; and
   fastening means for joining together said right and left panels to close the bag.

2. The invention as defined in claim 1 wherein said base has a width greater than the width of said bicycle frame.

3. The invention as defined in claim 1 wherein said base comprises further: a wood material of a substantially rectangular elongate geometry, a rectangular shaped compartment of flexible fabric material, said wood material being fitted within said compartment.

4. The invention as defined in claim 3 wherein said base comprises further: means for extending the width of said base.

5. The invention as defined in claim 4 wherein said means for extending the width of said base comprises: a plurality of rods mounted to the outside bottom portion of said wood material and pivotally movable from a position underlying said wooden material to an extended position beyond the width edge of said wood material.

6. The invention as defined in claim 1 wherein said fastening means comprises a zipper.

7. The invention as defined in claim 1 further comprising grip means attached to each of said panels.

8. A bag having right and left side panels of flexible fabric material;
a rigid elongated base at the bottom of said bag coupled to said panels; said bag being sufficient in size to receive the partially disassembled components of a bicycle, including the wheels and bicycle frame thereof;
coupling means connected to said base for holding said bicycle frame in a predetermined standing position relative to said base so that the center of gravity of said frame remains over said base;
a first flap of flexible of and material attached at one end to an upper end and on the inner side of said right side panel and depending therefrom downwardly to define with said right side panel a wheel-receiving compartment;
a second flap of flexible fabric material attached at one end to an upper end of and on the inner side of said left side panel and depending downwardly therefrom to define with said left side panel a second wheel-receiving compartment; and
fastening means for joining together said right and left panels to close the bag.

9. The invention as defined in claim 8 wherein said coupling means comprises further: first and second projecting pins connected to said base and spaced from one another thereon, said first pin projecting upwardly from said base for insertion into the head tube of said bicycle frame and said second pin projecting upwardly from said base for insertion into the seat tube of said frame for supporting said bicycle frame in an inverted standing position.

10. The invention as defined in claim 8 wherein said coupling means comprises further: first means for coupling to said head tube of said frame, and second means for coupling to said seat tube of said frame for supporting said frame in an inverted standing position.

11. A bag having right and left side panels of flexible fabric material;
a rigid elongated base at the bottom of said bag coupled to said panels; said bag being sufficient in size to receive the partially disassembled components of a bicycle, including the wheels and bicycle frame thereof;
coupling means connected to said base for holding said bicycle frame in a predetermined standing position relative to said base so that the center of gravity of said frame remains over said base, said coupling means including: first means for coupling to said head tube of said frame, and second means for coupling to said seat tube of said frame for supporting said frame in an inverted standing position; and
fastening means for joining together said right and left panels to close the bag.

12. A bag having right and left side panels of flexible fabric material;
a rigid elongated base at the bottom of said bag coupled to said panels; said bag being sufficient in size to receive the partially disassembled components of a bicycle, including the wheels and bicycle frame thereof;
coupling means connected to said base for holding said bicycle frame in a predetermined standing position relative to said base so that the center of gravity of said frame remains over said base, said coupling means including: first and second projecting pins connected to said base and spaced from one another thereon, said first pin projecting upwardly from said base for insertion into the head tube of said bicycle frame and said second pin projecting upwardly from said base for insertion into the seat tube of said frame for supporting said bicycle frame in an inverted upright position; and
fastening means for joining together said right and left panels to close the bag.

13. The invention as defined in claim 12 wherein each of said support pins is mounted for pivotal movement about the width axis of said base.

14. A bicycle bag for the components of a partially disassembled bicycle comprising:
a bag having right and left side panels of flexible fabric material;
a rigid flat base at the bottom of said bag coupled to said panels, said bag being sufficient in size to receive the components of a partially disassembled bicycle, including first and second wheels and a bicycle frame having a head tube and seat tube thereof; said base being of a length greater than the distance between said heat tube and seat tube of said bicycle frame and having a width greater than said bicycle frame;
coupling means connected to said base for holding said bicycle frame in a predetermined inverted standing position on said base;
a first flap of flexible fabric material attached to the inner side of said right side panel to define between said flap and said right side panel a wheel-receiving compartment and a second flap of flexible fabric material attached to said left side panel to define between said flap and said left side panel a second wheel-receiving compartment; and
fastening means for joining together said left and right side panels to close the bag.

15. The invention as defined in claim 14 wherein said flexible fabric material comprises vinyl.

16. The invention as defined in claim 14 wherein each said flap is attached at one end to an upper end of the respective side panel so as to allow said flaps to depend therefrom toward said base.

17. The invention as defined in claim 14 wherein said coupling means comprises further:
first pin means coupled to one location on said base central of said base width, and
a second pin means coupled to a second location on said base spaced from said first and central of said base width,
said pins being spaced apart substantially by a distance equal to the distance between said head tube and said seat tube of bicycle frame and projecting upwardly from said base for insertion within said head tube and seat tube of said bicycle frame to thereby support said bicycle frame in an inverted standing position.

18. A bag for carrying a partially disassembled bicycle, which includes a bicycle frame having a head tube and seat tube, and first and second wheels, comprising:

a rigid elongated base; said base having a length at least as great as the distance between the head tube and the seat tube of said bicycle frame, and a width greater than the width of said bicycle frame;

a first pin and first attaching means for attaching said pin to said base at a location proximate one end of said base and central of said base width;

a second pin and attaching means for attaching said second pin to said base at a location proximate the other end of said base and central of said base width;

said first pin having an outer diameter slightly less than the inner diameter of said fork tube of the subject bicycle and a length of at least two inches for insertion within said fork tube a sufficient distance to maintain said bike frame in an inverted standing position relative to said base;

said second pin having an outer diameter slightly less than the inner diameter of said seat tube and a length of at least two inches for insertion within said seat tube a sufficient distance to maintain said bike frame in an inverted standing position relative to said base;

right and left side panels extending from said base, each of said panels being of a flexible fabric material and each of said panels being large enough in areas to cover the right and left side areas defined by the side frame of said bicycle; each of said side panels defining further a shallow pouch for receiving, respectively, said first and second wheels;

a first flap for covering said first inner pouch, said first flap attached at one end to an upper inner side of said panel and depending therefrom;

a second flap for covering said second inner pouch, said second flap attached at one end to an upper inner side of the second panel and depending therefrom;

grip means coupled to said panels for providing a handle by which to carry said bag; and fastening means for joining together said panel means to close said bag and completely enclose said disassembled bicycle; said fastening means comprising a zipper.

19. The invention as defined in claim 18 further comprising first and second pivot means, and wherein each of said pins is pivotally connected by said pivot means to its respective attaching means for pivoting said pins along the length direction of said base to permit self adjustment for variations in the angle between said fork and seat tubes and said base and to permit such pins to be folded out of the way when not in use.

* * * * *

UNITED STATES PATENT OFFICE
CERTIFICATE OF CORRECTION

PATENT NO. : 3,886,988
DATED : June 3, 1975
INVENTOR(S) : Wayne E. Garrett and John W. McKean, Jr.

It is certified that error appears in the above-identified patent and that said Letters Patent are hereby corrected as shown below:

In Column 3, line 40, the word "components" should read -- component --. In Column 5, line 30, the word "loon" should read -- loop --. In Column 6, line 3, the word "axis" should read -- axle --. In Column 6, line 59, the word "uprights" should read -- upright --. In Column 7, line 41, the word "in" should read -- is --. In Column 8, line 45, between the words "base," and "tipping" insert -- a --. In Column 8, line 62, the word "tiping" should read -- tipping --. In Column 8, line 64, the word "momenets" should read -- moments --. In Column 8, line 66, the word "bag" should read -- bike --. In Column 9, line 13, the word "by" should read -- be --. In Column 11, line 26 (Claim 8), after the word "flexible" the words "of and" should be deleted and the word -- fabric -- inserted. In Column 12, line 37 (Claim 14), the word "heat" should read -- head --. In Item [73] on the front page, "a part interest" should read -- assignee of the ½ interest of John W. McKean, Jr. --.

Signed and Sealed this

Thirteenth Day of July 1976

[SEAL]

Attest:

RUTH C. MASON
Attesting Officer

C. MARSHALL DANN
Commissioner of Patents and Trademarks